United States Patent Office 3,681,093
Patented Aug. 1, 1972

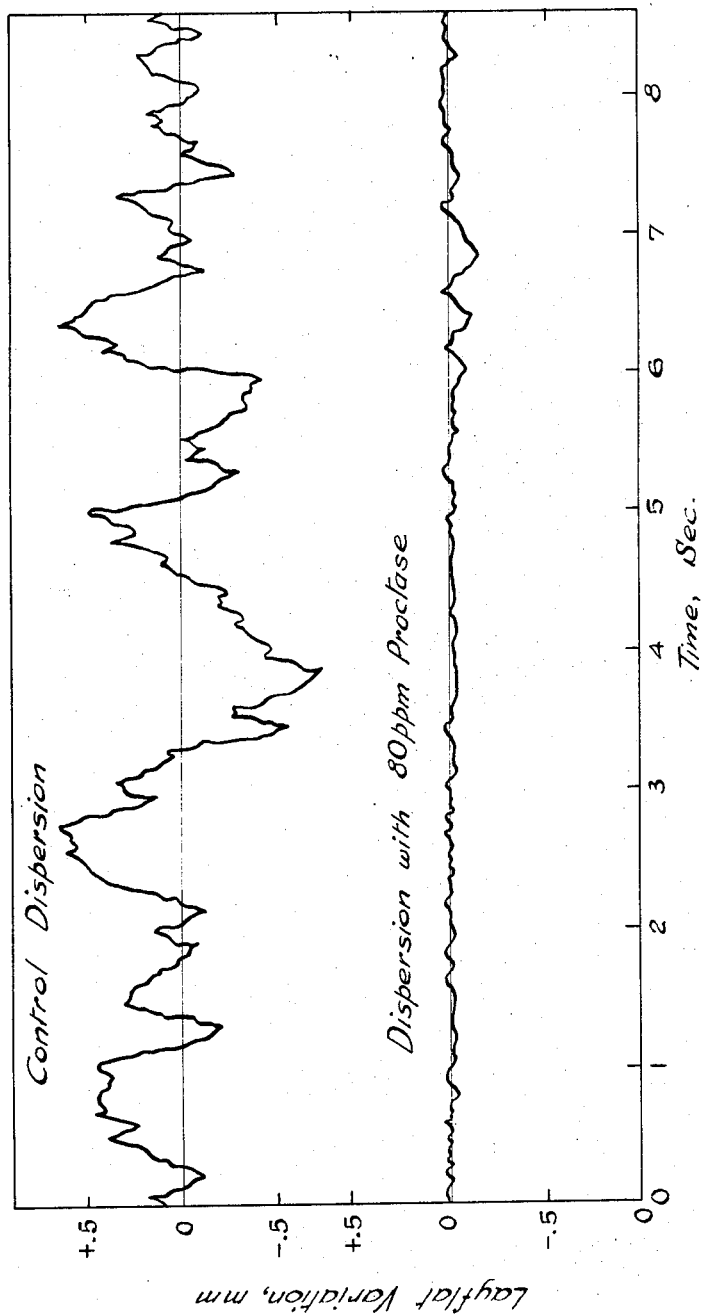

3,681,093
PROCESS FOR MAKING EDIBLE COLLAGEN CASINGS
Toshio Tsuzuki and Emanuel R. Lieberman, Somerville, N.J., assignors to Devro, Inc.
Continuation-in-part of application Ser. No. 726,940, May 6, 1968. This application June 11, 1970, Ser. No. 45,543
Int. Cl. D09f 9/04
U.S. Cl. 99—175     12 Claims

ABSTRACT OF THE DISCLOSURE

Fluid aqueous dispersions of fresh hide collagen for extrusion into casings such as for pork sausages and wieners are treated under acid conditions with an enzyme produced from the genus Aspergillus and then incubated prior to extrusion. After extrusion, the enzyme in the casing is inactivated by treating the casing with an alkaline solution.

BACKGROUND OF THE INVENTION

This application is a continuation-in-part of copending application Ser. No. 726,940, now abandoned, filed May 6, 1968, entitled "Processing for Making Edible Collagen Casing."

This invention relates to new and useful methods for producing a collagen tube from animal hides by continuous extrusion and to edible casings obtained thereby.

The product of the invention is particularly useful for encasing fresh pork sausages and wieners.

It is customary to obtain collagen from animal hides by converting them into a fluid dispension of swollen collagen fibrils, using mechanical disintegration and the swelling action of dilute acids under controlled conditions to achieve the conversion. Casings are made by extruding the fluid mass into a coagulating bath, such as a concentrated solution of ammonium sulfate, to form a tube having sufficient tensile strength to permit it to undergo a series of conditioning steps (usually including hardening, washing, and drying). One typical such method of making artificial collagen casings is described in U.S. Pat. No. 3,123,653.

It is highly desirable that the diameter and wall thickness of the extruded tube should be uniform, which in turn requires that the extrusion pressure and rate be steady and consistent. However, it has been found that the fluid mass of swollen collagen fibrils that must be extruded frequently has characteristics that interfere with the smooth and uniform extrusion of the mass. Such extrusion difficulties may be associated, for instance, with seasonal variations in the quality of the available hides. With some dispersions, a relatively high extrustion pressure may be required, and fluctuations or pulsations in the extrusion pressure cause a corresponding series of variations in the wall thickness and/or diameter of the tubing extruded. It is therefore desirable to provide means for modifying in a controllable manner the nature and characteristics of the dispersion of collagen fibrils before extrusion, to avoid the difficulties referred to above and to ensure a more uniform product.

It is also desirable to provide means for modifying the nature of the dispersion in such a way as to increase the tenderness of the extruded casing.

It is an object of the present invention to provide controllable means for improving the extrusion characteristics of a fluid dispersion of collagen fibrils.

Another object of this invention is to produce, from hide, collagen casings that have uniform diameter and wall thickness.

Another object of the invention is to provide a fluid mass of collagen fibrils that can be extruded generally under a relatively low but uniform extrusion pressure and at relatively high rates of extrusion.

Another object of the invention is to increase the tenderness of casings made from hide.

DESCRIPTION OF THE PRIOR ART

The prior art did not attain the foregoing objects to solve the problems solved by the present invention in the same way as the present invention does.

Fagen U.S. 3,373,046 entitled "Process for the Manufacture of Collagen Casings from Limed Hides" treated limed hides with enzymes to assist in the removal of calcium from his limed hide starting material, but then destroyed or removed the enzyme before acid was added to form the fluid mass of acid-swollen fibrils. As will be seen, the process of the instant invention starts with either fresh or unlimed hides and allows the enzyme (which is completely different from any of those used by Fagan) to remain undestroyed and unremoved and thereby to be present when the fluid mass of acid-swollen fibrils is formed.

Fujii U.S. 3,314,861 entitled "Method for Solubilizing Insoluble Collagen Fibers" treated the insoluble collagen of steer hide with various enzymes to completely solubilize the collagen into a solution from which a casing can be prepared. The process of the instant invention differs in that it never allows the enzyme-treated collagen to completely solubilize and form a solution (solubilization occurs only to the extent of about 10–20 percent) and which instead of forming casing from a solution, forms casing by extruding a fluid mass of acid-swollen collagen fibrils.

Thus the prior art never dealt with the problem solved by the present invention if improving the extrusion characteristics of the fluid mass of acid-swollen collagen fibrils.

SUMMARY OF THE INVENTION

It has now been discovered that the extrusion of an aqueous dispersion of acid-swollen collagen fibrils can be greatly improved if the extrusion mass of dispersed hide solids is reacted prior to extrusion with one of the enzymes that are extracted from the fermentation products of the genus Aspergilli so that the collagen becomes partially solubilized with the amount of soluble collagen produced being about 1.1 to 4.0 times the soluble collagen content of the same extrusion dispersion would be when produced in the absence of said enzyme. Such enzymes are described in Canadian Pat. No. 750,900. The quantity of the enzyme used is related to the reaction time and temperature and may vary from about 5 p.p.m. to about 200 p.p.m. (based on the weight of the hide solids in the dispersion) when the extrusion mass is stored for 8 hours to 72 hours at a temperature between 15° C. and 30° C. after the addition of the enzyme and before the dispersion of hide solids is extruded.

BRIEF DESCRIPTION OF THE DRAWING

The improvement in the uniformity of collagen casings when extruded in accordance with the present invention will be better understood from the accompanying drawing which illustrates the variation in the "layflat" dimension of extruded collagen casings.

DESCRIPTION OF THE PREFERRED EMBODIMENTS

It will be understood that the foregoing general description and the following detailed description are explanatory and exemplary but do not restrict the invention.

The method of preparing the product of the present invention will be more fully understood from the following examples, wherein all parts are expressed in parts by weight unless otherwise indicated.

The starting material for the present invention is fresh (including frozen or salt-cured) dehaired hides or fresh unlimed hides (where the hair has been removed by lime and the lime thereafter removed), preferably hides from steers having an average age of 1½ years. Representative examples illustrating the preparation of a fluid mass of swoolen collagen fibrils according to the preferred kind of preparation are disclosed in U.S. Pats. Nos. 3,123,481 and 3,123,653.

As described in the said patents, the process for preparing an extrudable dispersion of collagen fibrils in general terms includes the first steps of grinding and comminuting the slurry in a comminuting machine, adding acid and allowing the fibrils to swell during an incubation period. According to the invention, the procedures for swelling the collagen by adding an acid mixture of the slurry is modified in that a proteolytic enzyme produced from the genus Aspergilli is either added to the acid mixture before the latter is added to the collagen or alternatively and preferably, is added to the collagen before it is swelled by addition of the acid mixture thereto. Either way the proteolytic enzyme is present (either with the hide or the acid) at the moment when the slurry of comminuted hide has acid added thereto and immediately begins to swell to form a fluid mass or dispersion of acid-swollen collagen fibrils. Preferably the dispersion is homogenized and deaerated during the incubation period and filtered before being extruded.

The preferred enzyme is produced from *Aspergillus niger* var. *macroporous* and available from Meiji Seika Kaisha Ltd. of Japan under the name "Proctase." It has an activity of $15 \times 10^4$ (PU) at pH 2.6 and $2 \times 10^3$ (PU) at pH 1.5. The preferred amount is from 10 to 50 parts per million based on the weight of hide solids. The preferable incubation time and temperature is between about 20 and 48 hours at a temperature of between about 20 and 25° C.

Another enzyme suitable for use in the practice of the present invention is produced from *Aspergillus saitoi* and has an activity of $15 \times 10^4$ (PU) at pH 2.6. That product is available from Seishin Pharmaceutical Co., Ltd. under the name "Molsin." A further usable enzyme is produced from *Aspergillus oryzae* and is availabel from Rohm and Haas under the name "Rhozyme."

The enzyme-treated collagen mass is extruded into a coagulant. This may be a coagulation bath which may be an aqueous ammonium sulfate solution (from 37–42 percent weight/ volume) having a pH of between 7.5 and 8.0. The contact time of the casing in the bath being about 8 seconds. Following extrusion, the casing is soaked in a "prewash" solution and then in a fixing solution (which is an alkaline medium having a pH of about 9.0 or higher) which hardens the casing and inactivates the enzyme. The fixed casing is then washed with chilled water and plasticized in a plasticizing solution. It is then dried and cut into convenient sections, stirred into the desired lengths, and heat-cured.

The enzyme-treated collagen mass may also be extruded using a gas-containing ammonia as the coagulant in the manner shown in the application of Paul V. Fagan Ser. No. 759,931 filed Sept. 16, 1968, entitled "Process for the Manufacture of Edible Collagen Casings," now U.S. Pat. 3,535,125. When this procdure is used, the ammonia gas coagulant also serves as the alkaline medium having a pH of about 9.0 or higher which inactivates the enzyme as the coagulated casing remains in contact with ammonia gas.

The casings made by the process of the present invention are very similar to those made by the non-enzyme process in terms of their appearance and cooking properties in sausage products made therefrom but have the advantage of increased tenderness.

Testing procedures used in examples

In-Process Breaking Strength.—After each wet processing step, sections of wet casing are cut from the continuous tube and stressed until they break. The maximum load (in grams) at the breaking point is recorded, the average of the five determinations being recorded as the "In-Process Breaking Strength."

Hot Acid Breaking Strength.—The Hot Acid Breaking Strength is the load (in grams) that is applied to a casing soaked in a hot acid solution at the moment of breaking.

The following examples are illustrative of the invention and should not be regarded as suggesting that the invention could not be carried out in other ways. Throughout the specification and examples that follow, all quantities are expressed in parts by weight unless otherwise indicated.

EXAMPLE I

Preparation of control without enzyme

The corium of fresh acid-dehaired steer hides is ground in a meat grinder until it will pass a ¼ inch screen. To 22.8 parts of the ground hide corium is added 277.2 parts of water. The mixture is then passed through a comminuting machine to produce a uniform aqueous slurry.

A control dispersion is prepared by mixing 100 parts of this aqueous collagen slurry with 100 parts of a dilute acid solution consisting of 1.52 parts of Kraft sulfite process alpha-cellulose, 2.28 parts of lactic acid, and 96.2 parts of water.

The control collagen dispersion so obtained has the following composition:

| | Percent |
|---|---|
| Hide solids | 3.8 |
| Cellulose | 0.76 |
| Lactic acid | 1.14 |

This extrusion composition is held at a temperature of 22° C. for 20 hours, homogenized at a pressure of 3,000 pounds per square inch, and deaerated. The fluid mass is then stored at 22° C. for an additional 20 hours, filtered through 6 x 8 mil openings, and extruded through an annular orifice into a coagulation bath maintained at 21° C. The coagulation bath is a 40 percent weight/volume aqueous ammonium sulfate solution (100 liters of solution contains 40 kilograms of ammonium sulfate) the pH of which is adjusted to 7.5–8.0 by the addition of ammonium hydroxide. The extruded casing remains in the coagulation bath for 8 seconds and is passed through a 13 percent weight/volume prewash solution of ammonium sulfate, the pH of which is adjusted to 7.0–7.5 with ammonium hydroxide. The dwell time of the extruded casing in the prewash solution is 17 minutes. The casing then passes through a fixing solution of aqueous ammonium hydroxide maintained at pH 9.0 and 22° C. The dwell time of the casing in the aqueous ammonium hydroxide solution is also 17 minutes. The casing is next washed with water at 10° C. for 40 minutes, plasticized in an aqueous solution containing 4.5 percent weight/volume glycerin and 1.0 percent weight/volume carboxymethyl cellulose. The plasticizing solution is maintained at 22° C., and the dwell time of the casing in this solution is 8 minutes.

The casing after removal from the plasticizing bath is dried, cut into 30-foot sections, and shirred. Some of the shirred sections of the casing so obtained are heat cured for 24 hours at 80° C. Other shirred sections of this casing are heat cured for 24 hours at 90° C.

All samples of the product so obtained are equilibrated at 70 percent relative humidity prior to testing. The extrusion characteristics and physical properties of the control casing prepared in accordance with this example are summarized in Table I.

EXAMPLE II

In accordance with the present invention, an extrusion mass is prepared by mixing 100 parts of the aqueous collagen slurry described in paragraph 1 of Example I with 100 parts of a dilute acid solution consisting of 1.52 parts of Kraft sulfite alpha-cellulose 2.28 parts lactic acid, 0.000152 part of an enzyme produced by *Aspergillus niger* ("Proctase"), and 96.2 parts of water. The collagen dispersion so obtained has the following composition:

| | Percent |
|---|---|
| Hide solids | 3.8 |
| Cellulose | 0.76 |
| Lactic acid | 1.14 |
| Enzyme (*Aspergillus niger*) | 0.000076 |

This extrusion composition is stored at a temperature of 22° C. for 20 hours, homogenized at a pressure of 3,000 pounds per square inch, and deaerated. The fluid mass is then stored at 22° C. for an additional 20 hours, filtered through 6 x 8 mill openings, and extruded and processed exactly as described in Example I above.

All samples of the product so obtained are then equilibrated at 70 percent relative humidity prior to testing. The extrusion characteristics and physical properties of the casing prepared in accordance with this example are summarized in Table I.

TABLE I

| | Example | | |
|---|---|---|---|
| | I[1] | II | III |
| Proctase, p.p.m. (based on hide solids) | 0 | 20 | 100 |
| Extruder pressure, p.s.i. | 63–80 | 73 | 60 |
| In-process wet breaking strength, grams, after: | | | |
| Coagulant treatment | 506 | 718 | 614 |
| Prewash | 552 | 628 | 616 |
| NH₃-hardening | 484 | 514 | 522 |
| Water-washing | 360 | 394 | 490 |
| Plasticizer treatment | 388 | 456 | 580 |
| Cure temperature, ° C | 80  90 | 80  90 | 80  90 |
| Hot acid breaking strength, grams | 604  874 | 602  873 | 332  872 |

[1] Control.

EXAMPLE III

In accordance with the present invention, an extrusion mass is prepared by mixing 100 parts of the aqueous collagen slurry described in paragraph 1 of Example I with 100 parts of a dilute acid solution consisting of 1.52 parts of kraft sulfite alpha-cellulose, 2.28 parts lactic acid, 0.00076 part of an enzyme produced by *Aspergillus niger* ("Proctase"), and 96.2 parts of water. The collagen dispersion so obtained has the following composition:

| | Percent |
|---|---|
| Hide solids | 3.8 |
| Cellulose | 0.76 |
| Lactic acid | 1.14 |
| Enzyme (*Aspergillus niger*) | 0.00038 |

This extrusion composition is stored at a temperature of 22° C. for 20 hours, homogenized at a pressure of 3,000 pounds per square inch, and deaerated. The fluid mass is then stored at 22° C. for an additional 20 hours, filtered through 6 x 8 mil openings, and extruded and processed exactly as described in Example I above.

All samples of the product so obtained are equilibrated at 70 percent relative humidity prior to testing. The extrusion characteristics and physical properties of the casing prepared in accordance with this example are summarized in Table I.

EXAMPLE IV

In accordance with the present invention, an extrusion mass is prepared by mixing 100 parts of the aqueous collagen slurry described in paragraph 1 of Example I with 100 parts of a dilute acid solution consisting of 1.52 parts of kraft sulfite alpha-cellulose, 2.28 parts lactic acid, 0.00076 part of an enzyme produced by *Aspergillus niger* ("Proctase"), and 96.2 parts of water. The collagen dispersion so obtained has the following composition:

| | Percent |
|---|---|
| Hide solids | 3.8 |
| Cellulose | 0.76 |
| Lactic acid | 1.14 |
| Enzyme (*Aspergillus niger*) | 0.00038 |

The composition is processed exactly as described in Example I above and divided into four equal parts immediately prior to extrusion.

Each aliquot part is extruded. The first part is extruded to produce a 21 mm. casing at 80 p.s.i. extrusion pressure, the second part is extruded to produce a 23 mm. casing at 82 p.s.i. extrusion pressure, the third part is extruded to produce a 23 mm. casing at 80 p.s.i. extrusion pressure and the fourth part is extruded to produce a 21 mm. casing at 73 p.s.i. extrusion pressure. The four products so obtained are identified by Extrusion Numbers 1 to 4 respectively. The casings produced by Extrusions 1 and 2 are processed exactly as described in Example I. The product of Extrusions 3 and 4 are similarly processed except that the plasticizing solution contains 200 p.p.m. dextrose. The product from Extrusions 1 and 2 is stuffed with fresh pork sausage meat and that from Extrusions 3 and 4 is stuffed with a wiener mixture, linked with a standard Ty linker and smoked. All gave satisfactory results. The extrusion and casing characteristics associated with these four products are set out in Table II.

TABLE II

| Extrusion Number | 1 | | 2 | | 3 | | 4 | |
|---|---|---|---|---|---|---|---|---|
| Enzyme ("Proctase") p.p.m. (based on hide solids) | 100 | | 100 | | 100 | | 100 | |
| Extrusion pressure, p.s.i. | 80 | | 82 | | 80 | | 73 | |
| Casing size, mm | 21 | | 23 | | 23 | | 21 | |
| Dextrose in plasticizer, p.p.m | 0 | | 0 | | 200 | | 200 | |
| In-process wet breaking sternght, g., after: | | | | | | | | |
| Coagulant treatment | 722 | | 756 | | | | | |
| Prewash | 768 | | 776 | | | | | |
| NH₃-hardening | 734 | | 756 | | | | | |
| Water-washing | 632 | | 658 | | | | | |
| Plasticizer treatment | 720 | | 738 | | 772 | | 772 | |
| Cure temperature, ° C | 80 | 90 | 80 | 90 | 80 | 90 | 80 | 90 |
| Hot acid breaking strength, g | 645 | 796 | 580 | 810 | 1,175 | 2,000 | 765 | 1,795 |

EXAMPLE V

To 7.1 parts of ground hide corium (dry hide solids) is added 92.9 parts water. After passing through a comminuting machine, the slurry is mixed with 100 parts of a solution consisting of 1.42 parts of Kraft sulfite process alpha-cellulose, 2.36 parts of lactic acid, 0.000568 part (80 p.p.m. based on hide solids) "Proctase" and 96.22 parts water to make a fluid dispersion. The dispersion is processed as described in Example I. This extrusion composition is extruded at three different pump speeds and the extrusion pressure and the appearance of the casing in the coagulation column are compared with the control composition described in Example I. The following extrusion pressure readings are obtained as the speed of the pump supplying the composition to the extruder is varied.

|  | Extrusion pressure | |
|---|---|---|
|  | P.s.i. | Control |
| Pump speed: | | |
| Normal | 66 | 75–95 |
| Faster | 77 | 90–110 |
| Slower | 56 | 65–80 |

It was noted in extruding the collagen composition of this example that the appearance of the casing in the coagulation column does not change noticeably with the extrusion speed.

That portion of the extrusion composition of this example that is extruded at the nomal pump speed (extrusion pressure 66 p.s.i.) is coagulated in a column equipped at the top with a sensing unit made by Matrix Control, Somerville, N.J., adapted to measure differences in the "layflat" diameter of the extruded casing. The sensing unit is connected with a high speed recorder made by Consolidated Electronics Co., Monrovia, Calif., whereby any variation in the layflat dimension of the casing is recorded continuously. A control dispersion as prepared in Example I is extruded at the same pump speed for comparison and the dimensional variations of this casing are recorded. The contrast between the extrusion composition made according to this example and the control extrusion composition of Example I is shown on the attached drawing. As can be seen from the drawing, casings made without the use of enzyme (i.e. the control dispersions) are not uniform throughout and demonstrate relatively wide variance, being sometimes wider or narrower than desired. But the casing of this example has no such variance and is almost precisely as desired. In conjunction with this uniformity of layflat, uniformity of thickness is also obtained.

EXAMPLE VI

The corium of fresh unlimed hides is ground in a meat grinder with a ¼ inch plate. In 92.90 parts of water is dispersed 7.10 parts (dry) of ground hide, and the mixture is passed through a comminuting machine to produce a uniform aqueous slurry.

A control dispersion is prepared by mixing 50 parts of this aqueous collagen slurry with 50 parts of a dilute dispersion consisting of 0.72 part of cellulose, 0.156 part of hydrochloric acid and 49.124 parts of water.

The control collagen dispersion so obtained has the following composition:

|  | Percent |
|---|---|
| Hide solids | 3.55 |
| Cellulose | 0.72 |
| Hydrochloric acid | 0.156 |

The extrusion composition is stored at about 20° C. for 20 hours, homogenized at a pressure of 3,000 pounds per square inch, and deaerated. The mass is stored at 20° C. for an additional 20 hours, filtered through 6 x 8 mil openings, and extruded through a 15 mil annular orifice. A sample of the extrusion mass is set aside for soluble collagen analysis (see Example X). The extruded tube is inflated on a moving Mylar belt with air, and ammonia gas is metered into the interior of the tube so that the form and diameter of the tube can be maintained while the acid present in the extrusion mass is neutralized. (The procedure used is that described in detail and claimed in the copending application of Paul V. Fagan filed Sept. 16, 1968, as Ser. No. 759,931 entitled "Process for the Manufacture of Edible Collagen Casings," now U.S. Pat. 3,535,125 and which is incorporated herein by reference.) The tube is flattened with a pinch roll and dropped into a series of baskets containing counter-flowing water which is maintained at 12° C. to remove the excess ammonia and ammonium chloride. The washed casing is then passed through a 23° C. plasticizer solution containing 4.5 percent (weight/volume) glycerin and 1.0 percent (weight/volume) carboxymethylcellulose. The casing out of the plasticizer bath is perforated, inflated with air to be dried continuously, cut into 30-foot sections, and shirred. The shirred casings are classified into four groups for heat cure treatment: one group receives no heat cure treatment, the second group is heat cured at 75° C. for 15 hours, the third at 75° C. for 24 hours and the fourth at 80° C. for 15 hours. All samples of the product so obtained are equilibrated at 70 percent relative humidity before being tested. The extrusion and casing characteristics of this comparative example are summarized in Table III.

EXAMPLE VII

In accordance with the present invention, an extrusion mass is prepared by mixing 50 parts of the aqueous collagen slurry described in paragraph 1 of Example VI with 50 parts of a dilute acid solution consistings of 0.72 parts of cellulose, 0.156 hydrochloric acid, 0.000496 part of an enzyme produced by *Aspergillus niger* ("Proctase") and 49.124 parts of water. The collagen dispersion so obtained has the following composition:

|  | Percent |
|---|---|
| Hide solids | 3.55 |
| Cellulose | 0.72 |
| Hydrochloric acid | 0.156 |
| Enzyme (*Aspergillus niger*) | 0.000496 |

This extrusion composition is stored at a temperature of 20° C. for 20 hours, homogenized at a pressure of 3,000 pounds per square inch, and deaerated. The mass is then stored at 22° C. for an additional 20 hours, filtered through 6 x 8 mil openings, and extruded and processed exactly as described in Example VI. (The enzyme present in the extrusion compositions was inactivated by the ammonia gas initially used as the coagulant which acted as an alkaline medium having a pH of 9.0 or higher.)

All samples of the product so obtained are then equilibrated at 70 percent relative humidity before being tested.

The extrusion and casing characteristics are summarized in Table III.

TABLE III

| Example | VI [1] | | | | VII | | | |
|---|---|---|---|---|---|---|---|---|
| Proctase, p.p.m. (based on hide solids) | 0 | | | | 140 | | | |
| Soluble collagen, percent (based on total collagen): | | | | | | | | |
| At the beginning of extrusion | 1.4 | | | | 4.5 | | | |
| 24 hrs. after the beginning of extrusion | 1.6 | | | | 5.4 | | | |
| Extruder pressure, p.s.i. | 88 | | | | 70 | | | |
| In-process wet breaking strength, g.: | | | | | | | | |
| Before water wash | 350 | | | | 268 | | | |
| After water wash | 660 | | | | 623 | | | |
| After plasticizer treatment | 620 | | | | 656 | | | |
| Finished casing layflat range, mm | ±1.0 | | | | ±0.5 | | | |
| Cure temperature (° C.) | ([2]) | 75 | 75 | 80 | ([2]) | 75 | 75 | 80 |
| Time (hr.) | | 15 | 24 | 15 | | 15 | 24 | 15 |
| Hot acid breaking strength, g. | 711 | 654 | 675 | 622 | 419 | 459 | 511 | 529 |

[1] Control.
[2] No cure.

EXAMPLE VIII

In accordance with the present invention an extrusion mass is prepared by mixing 50 parts of an aqueous collagen slurry made exactly as described in paragraph 1 of Example VI but using a different sample of unlimed hide with 50 parts of a dispersion consisting of 0.72 part of cellulose, 0.156 part of hydrochloric acid, 0.000568 part of an enzyme produced by *Aspergillus saitoi* ("Molsin") and 49.124 parts of water.

A control dispersion was prepared by mixing 50 parts of the same aqueous collagen slurry with 50 parts of a dispersion consisting of 0.72 part of cellulose, 0.156 part of hydrochloric acid, and 49.124 parts of water.

Both the extrusion composition and the control dispersion are stored at 20° C. for about 20 hours, homogenized at a pressure of 3,000 pounds per square inch, and deaerated. The fluid masses are stored at 20° C. for an additional 20 hours, filtered through 6 x 8 mil openings, and extruded and processed exactly as described in Examples VI and VII.

All samples of the products so obtained are then equilibrated at 70 percent relative humidity before being tested. The extrusion characteristics and physical properties of the products produced according to this example are summarized in Table IV.

TABLE IV

| Example | VIII [1] | | | | VIII | | | |
|---|---|---|---|---|---|---|---|---|
| Molsin, p.p.m. (based on hide solids) | 0 | | | | 160 | | | |
| Soluble collagen, percent (based on total collagen): | | | | | | | | |
| At the beginning of extrusion | 0.53 | | | | 1.76 | | | |
| 24 hrs. after the beginning of extrusion | | | | | 2.12 | | | |
| Extruder pressure, p.s.i. | 128±10 | | | | 109±3 | | | |
| In-process wet breaking strength, g.: | | | | | | | | |
| Before water wash | 297 | | | | 316 | | | |
| After water wash | 738 | | | | 748 | | | |
| After plasticizer treatment | 729 | | | | 656 | | | |
| Cure temperature (°C.) | (2) | 75 | 75 | 80 | (2) | 75 | 75 | 80 |
| Time (hrs.) | | 15 | 24 | 15 | | 15 | 24 | 15 |
| Hot acid breaking strength, g. | 429 | 457 | 719 | 619 | 398 | 401 | 495 | 398 |

[1] Control.
[2] No cure.

EXAMPLE IX

The extrusion composition described in Example V is analyzed for soluble collagen by diluting a sample to a collagen solids concentration of 0.2 to 0.5 percent and centrifuging at 0–5° C. and 48,000 G. The collagen that remains in the supernatant liquid (soluble collagen) amounts to 11.5 percent to the total weight of collagen present in the composition. This experiment is repeated on samples aged at room temperature an additional 72 hours and 144 hours. In these aged samples the amount of soluble collagen increases to 14.7 percent and 18.6 percent, respectively.

In as much as most extrusion compositions are extruded soon after their preparation, this example indicates that the extrusion compositions of the present invention are likely to contain about 12 percent of soluble collagen, based on the total weight of collagen present in the extrusion composition and when measured by the water extrusion procedure described. Since the proportion of soluble collagen in a typical extrusion composition of the kind represented by the control dispersion of Example I is known to be about 3 percent, the increase in soluble collagen content achieved by the process of this invention is up to about four times. An increase of from 2 to 4 times has a beneficial effect of the extrusion and casing characteristics.

EXAMPLE X

The soluble collagen content expressed as percent on total collagen for all the extrusion masses used in Examples VI through VIII is determined as follows.

An approximately 100 g. of extrusion mass is mixed thoroughly with about 100 cc. of 1 percent aqueous solution of ammonia in a Waring Blendor. The mixture is freeze dried and pulverized with a Wiley mill to pass a 10-mesh screen. The powder is dried in a desiccator over $P_2O_5$. About 1 g., weighed accurately, of the dried powder is dispersed in 100 ml. of 0.05 M (pH 3.5) citrate buffer solution in a cold room (about 4° C.) using a magnetic stirrer. The dispersion is centrifuged at 0–5° C. and 48,000 G. The standard method of hydroxyproline analysis is applied on 1 ml. aliquot of the supernate to obtain the quantity of soluble collagen. The total collagen content is determined separately to find the percent figure.

EXAMPLE XI

The method to determine soluble collagen as given in Example X is preferred over the method described in Example IX because of the use of 0.05 M citrate buffer which can control the conditions of solubilization.

To compare these two methods a collagen dispersion containing Proctase was prepared as follows. In 46.45 parts of water is dispersed 3.55 parts (dry) of ground unlimed hide. The dispersion is comminuted and mixed thoroughly with 50 parts of aqueous solution containing 0.15 part of hydrochloric acid. The viscous collagen dispersion is incubated at 30° C. for 48 hours, before it is analyzed for soluble collagen by the two methods.

The citrate buffer extraction method found 7.30 percent soluble collagen based on total collagen, while the water extraction method gave 5.52 percent soluble collagen based on total collagen.

EXAMPLE XII (This example shows the addition of the enzyme to the ground hide rather than to the acid and is illustrative of a preferred procedure.)

The corium of fresh unlimed hides is ground in a meat grinder with a ¼ inch plate. In 92.90 parts of water is dispersed 7.10 parts (dry) of ground hide and 0.000426 part of an enzyme produced by *Aspergillus oryzae* ("Rhozyme P–11 Concentrate" of Rohm and Haas Company with Manufacturer's factor of 5.38). The mixture is mixed thoroughly and passed through a comminuting machine to produce an aqueous slurry. The extrusion composition is prepared by mixing this aqueous collagen-enzyme dispersion with 100 parts of another dispersion consisting of 1.44 parts of cellulose, 0.312 part of hydrochloric acid and 98.248 parts of water.

The extrusion composition is stored at about 20° C. for 20 hours, homogenized at a pressure of 3,000 pounds per square inch, and deaerated. The mass is stored at 20° C. for an additional 20 hours, filtered through 6 x 8 mil openings, extruded onto a moving Mylar belt and processed exactly as described in Examples VI and VII.

A control extrusion mass is prepared in the exact same manner as the above-described enzyme-containing extrusion mass, except for the omission of enzyme and extruded and processed as described in Example VI.

The dried and shirred casings prepared from each of these two extrusion masses are classified into three groups for heat cure treatment: one group receives no heat cure treatment, the second group is heat cured at 75° C. for 15 hours, and the third at 75° C. for 24 hours. All samples of the product so obtained are equilabrated at 70 percent relative humidity before being tested. The extrusion and casing charatceristics of these samples are summarized in the following table.

TABLE V

| | Control | | | Enzyme | | |
|---|---|---|---|---|---|---|
| Rhozyme P-11, p.p.m. (based on hide solids) | 0 | | | 60 | | |
| Soluble collagen, percent (based on total collagen): | | | | | | |
|   At the beginning of extrusion | 1.36 | | | 1.53 | | |
|   24 hours after the beginning of extrusion | 1.73 | | | 1.62 | | |
| Extruder pressure, p.s.i. | 87.5 | | | 73 | | |
| In-process wet breaking strength, g.: | | | | | | |
|   Before water wash | 342 | | | 432 | | |
|   After water wash | 496 | | | 663 | | |
|   After plasticizer treatment | 720 | | | 634 | | |
| Cure temperature (° C.) | (¹) | 75 | (¹) | 75 | | |
| Time (hrs.) | | 15 | 24 | | 15 | 24 |
| Hot acid breaking strength, g. | 617±13 | 644±28 | 727±47 | 688±34 | 741±60 | 770±75 |

¹ No cure.

We claim:

1. An improved process for making a tubular edible collagen material by the known steps of (1) adding acid to comminuted fresh dehaired animal hide or fresh unlimed dehaired animal hide thereby causing the comminuted hide to swell, (2) holding the resultant fluid mass of acid-swollen collagen fibrils for a period of 8 to 72 hours at a temperature between 15 and 30° C., (3) extruding said incubated fluid mass of acid-swollen collagen fibrils through an annular nozzle into a coagulant, and (4) hardening the resultant tubular collagen material, wherein the improvement comprises the steps of: (a) adding from 5 to 200 parts per million based on the weight of hide solids of a proteolytic enzyme produced by the genus Aspergilli to the comminuted hide at a time no later than the time acid is added to said comminuted hide to cause said comminuted hide to swell, (b) allowing the proteolytic enzyme to remain while the resultant enzyme-containing fluid mass of acid-swollen collagen fibrils is incubated and extruded into a coagulant, and (c) inactivating the enzyme present in the coagulated tubular collagen material so formed by contacting it with an alkaline material having a pH of above about 9.0.

2. The process of claim 1 wherein the proteolytic enzyme is added to the comminuted hide prior to the addition of the acid.

3. The process of claim 1 wherein the proteolytic enzyme is added to the comminuted hide simultaneously with the acid.

4. The process of claim 1 wherein the proteolytic enzyme used is selected from the group consisting of enzymes extracted from the fermentation products of *Aspergillus niger* var. *macroporous*, *Aspergillus saitoi*, and *Aspergillus oryzae*.

5. The process of claim 4 wherein from 10 to 50 parts per million, based on the weight of hide solids, of proteolytic enzyme is used.

6. The process of claim 1 wherein the enzyme-containing fluid mass of acid-swollen collagen fibrils is incubated for a period of between 20 and 48 hours at a temperature of between 20 and 25° C.

7. The process of claim 1 wherein the enzyme-containing fluid mass of acid-swollen collagen fibrils is extruded into a coagulant which is a coagulating bath consisting of an ammonium sulfate solution containing from 37 to 42 percent (weight/volume) of ammonium sulfate at a pH between about 7.5 and 8.0.

8. The process of claim 7 wherein the enzyme is inactivated by contacting with an alkaline solution having a pH of about 9.0.

9. The process of claim 8 wherein the enzyme is inactivated by contacting the coagulated tubular collagen material with a solution of ammonium hydroxide in water at about 22° C.

10. The process of claim 1 wherein the enzyme-containing fluid mass of acid-swollen collagen fibrils is extruded into a coagulant which is a gas containing ammonia.

11. The process of claim 10 wherein the enzyme is inactivated by contacting the coagulated tubular collagen material with a gas containing ammonia.

12. The process of claim 1 wherein the amount of soluble collagen produced in the enzyme-containing fluid mass of acid-swollen collagen fibrils at the time it is extruded is from 1.1 to 4 times the amount of soluble collagen produced in the absence of said enzyme.

References Cited

UNITED STATES PATENTS

| | | | |
|---|---|---|---|
| 2,973,302 | 2/1961 | Bloch | 99—175 X |
| 3,034,852 | 5/1962 | Nishihara | 99—175 X |
| 3,314,861 | 4/1967 | Fujii. | |
| 3,373,046 | 3/1968 | Fagan | 99—175 |

FRANK W. LUTTER, Primary Examiner

R. HALPER, Assistant Examiner

U.S. Cl. X.R.

264—202

PO-1050
(5/69)

UNITED STATES PATENT OFFICE
CERTIFICATE OF CORRECTION

Patent No. 3,681,093          Dated August 1, 1972

Inventor(s)   Toshio Tsuzuki et al

It is certified that error appears in the above-identified patent and that said Letters Patent are hereby corrected as shown below:

In Column 1, line 27, "Processing" should read --- Process ---.

In Column 1, line 35, "dispension" should read --- dispersion ---.

In Column 1, line 55, "extrustion" should read --- extrusion ---.

In Column 3, line 11, "swoolen" should read --- swollen ---.

In Column 6, Table 11, line 67, "796" should read --- 795 ---.

In Column 9, Table 1V, line 39, "619" should read --- 691 ---.

In Column 9, line 65, "of" should read --- on ---.

Signed and sealed this 13th day of March 1973.

(SEAL)
Attest:

EDWARD M. FLETCHER, JR.                    ROBERT GOTTSCHALK
Attesting Officer                          Commissioner of Patents